United States Patent
Torres et al.

(10) Patent No.: US 9,103,921 B2
(45) Date of Patent: Aug. 11, 2015

(54) PHOTONIC CRYSTAL SCINTILLATORS AND METHODS OF MANUFACTURE

(71) Applicant: Savannah River Nuclear Solutions, LLC, Aiken, SC (US)

(72) Inventors: Ricardo D. Torres, Aiken, SC (US);
Lindsay T. Sexton, Aiken, SC (US);
Roderick E. Fuentes, Aiken, SC (US);
José Cortes-Concepción, Aiken, SC (US)

(73) Assignee: Savannah River Nuclear Solutions, LLC, Aiken, SC (US)

(*) Notice: Subject to any disclaimer, the term of this patent is extended or adjusted under 35 U.S.C. 154(b) by 0 days.

(21) Appl. No.: 14/035,150

(22) Filed: Sep. 24, 2013

(65) Prior Publication Data
US 2014/0084174 A1 Mar. 27, 2014

Related U.S. Application Data

(60) Provisional application No. 61/704,817, filed on Sep. 24, 2012.

(51) Int. Cl.
*G01T 1/20* (2006.01)
*G01T 1/202* (2006.01)

(52) U.S. Cl.
CPC ............ *G01T 1/2002* (2013.01); *G01T 1/202* (2013.01)

(58) Field of Classification Search
CPC .... C09K 11/7733; G21K 4/00; G01T 1/2002; G01T 1/202
USPC .......................................................... 250/368
See application file for complete search history.

(56) References Cited

U.S. PATENT DOCUMENTS

| 5,837,345 | A   | * | 11/1998 | Nishino et al. | 428/141  |
|-----------|-----|---|---------|----------------|----------|
| 8,227,105 | B1  | * | 7/2012  | Gerald et al.  | 429/145  |
| 2005/0003295 | A1 | * | 1/2005 | Koninckx et al. | 430/139 |
| 2005/0271811 | A1 | * | 12/2005 | Douglas et al. | 427/248.1 |
| 2008/0135998 | A1 | * | 6/2008 | Witvrouw et al. | 257/678 |
| 2009/0042736 | A1 | * | 2/2009 | Bomer et al. | 506/10 |
| 2009/0162535 | A1 | * | 6/2009 | Tahon et al. | 427/69 |

OTHER PUBLICATIONS

Author: Y. Kanamori, K. Hane, H. Sai, and H. Yugami, Title: 100 nm period silicon antireflection structures fabricated using a porous alumina membrane mask, Date: Nov. 10, 2000, Publisher: Applied Physics Letters.*

Buyukserin, et al., "The Use of Reactive Ion Etching for Obtaining 'Free' Silica Nano Test Tubes", Appl. Surf. Sci., 256, 24, 7700 (2010).

Choi, et al., "Perfect two-dimensional porous alumina photonic crystals with duplex oxide layers", *Journal of Applied Physics*, vol. 94, No. 8; Oct. 15, 2008.

(Continued)

*Primary Examiner* — David J Makiya
*Assistant Examiner* — Taeho Jo
(74) *Attorney, Agent, or Firm* — Dority & Manning, P.A.

(57) ABSTRACT

Photonic crystal scintillators and their methods of manufacture are provided. Exemplary methods of manufacture include using a highly-ordered porous anodic alumina membrane as a pattern transfer mask for either the etching of underlying material or for the deposition of additional material onto the surface of a scintillator. Exemplary detectors utilizing such photonic crystal scintillators are also provided.

17 Claims, 11 Drawing Sheets

(56) References Cited

OTHER PUBLICATIONS

Fabian, et al., "Photonic Crystals: Enhancing the Light Output of Scintillation Based Detectors", Dissertation, Oct. 2012.

Fu, et al., "GaN-based light-emitting diodes with photonic crystals structures fabricated by porous anodic alumina template", *Optics Express*, vol. 19, No. S5, Sep. 5, 2011.

Guo, et al., "Fabrication of ZnTe Nanohoie Arrays by Reactive Ion Etching Using Anodic Alumina Templates", Jpn. J. Appl. Phys., vol. 41; (202); pp. L 118-120; 2002.

Hillbrenner, et al., Corking Nano Test Tubes by Chemical Self-Assembly, J. Am. Chem. Soc., 128, 13, 4236 (2006).

Hofstetter, et al., Uranium detection using smail scintillators in a maritime environment, J. Radioanal. Nucl. Chem., 276, 2, 433 (2008).

J.L. Jones, Active, Non-Intrusive Inspection Technologies for Homeland Defense, INEEL/CON-03-00181, DOE INL (2003).

Joannopoulos, et al., *Photonic Crystals: Molding the Flow of Light*, Princeton, UP 2008.

Johnson, et al., *Introduction to Photonic Crystals: Bloch's Theorum, Band Diagrams, and Gaps (But No Defects)*, MIT MRS Chapter: IAP tutorial series, 2003.

Jung, et al., "Enhancement of PL Intensity by Photonic Crystal fabricated on GaAs Substrate using Nanoporous Alumina Mask"; NMP17, undated.

Kim, et al., "Effect of a nanoporous surface on photoluminescence from nanopatterned GaN thin films fabricated by anodic alumina templates"; *Philosophical Magazine Letters*; vol. 90, No. 2, Feb. 2010, 83-92.

Knapitsch, et al., "Photonic crystals: A novel approach to enhance the light output of scintillation based detectors"; *Nuclear Instruments and Methods in Physics Research A*; 628; (2011); pp. 385-388.

Knapitsch, et al.; "Results of Photonic Crystal Enhanced Light Extraction on Heavy Inorganic Scintillators"; *IEEE Transactions on Nuclear Science*; vol. 59, No. 5, Oct. 2012.

Knoll, *Radiation Detection and Measurrnent*, 4th edition; Hoboken: Wiley, 2010.

Kronberger, et al., "Improving Light Extraction From heavy Inorganic Scintillators by Photonic Crystals"; *IEEE Transactions on Nuclear Science*; vol. 57; No. 5; Oct. 2010.

Kronberger, et al., "Probing the Concepts for Photonic Crystals on Scintillating Materials"; *IEEE Transactions on Nuclear Science*: vol. 55; No. 3; Jun. 2008.

Kuo, Reactive ion etching of indium tin oxide by $SiCl_4$-based plasmas—substrate temperature effect, *Vacuum*, 51, 4, 777 (1998).

Laux, et al, Room-temperature deposition of indium tin oxide thin films with plasma ion-assisted evaporation, *Thin Solid Films*, 35, 1-2, 1 (1998).

Law, et al., Enhanced Outcoupling of Electrolurninescence from $Zns:SErF_3$ Thin Films bv a Photonic Crystal, 29, *J. Vac. Sci. Technol. B*, 011003 (2003).

Lecoq, "New Approaches to Improve Timing Resolution in Scintillators"; *IEEE Transactions on Nuclear Science*; vol. 59, No. 5, Oct. 2012.

Lecoq, et al., "Factors Influencing Time Resolution of Scintillators and Ways to Improve Them"; *IEEE Transactions on Nuclear Science*, vol. 57, No. 5, Oct. 2010.

Mitchell, et al., Neutron detection with gamma-ray spectrometers for border security applications, *IEEE Trans. Nucl., Sci.*, 57, 4, 2215 (2010).

Mozalev, et al., "The formation of nanoporous membranes from anodically oxidized aluminium and their application to Li rechargeable batteries", Electrochim. Acta, 46, 18, 2825 (2001).

Nakao, et al., "GaAs and InP nano-hole arrays fabricated by reactive beam etching using highly ordered alumina membranes"; *10th Intern. Conf. on Indium Phosphide and Related materials*; 1998.

Lecoq, Molecular Imaging Challenges with PET; *IEEE Transactions on Nuclear Science*; vol. 57; No. 3; Jun. 2010.

Pignalosa, et al., "Giant light extraction enhancement of medical imaging scintillation materials using biologically inspired integrated nanostructures"; *Optics Letters*: vol. 37; No. 14; Jul. 15, 2012.

Skorobogatiy, et al., *Fundamentals of Photonic Crystal Guiding*, Cambridge UP, 2009.

Sulka, et al., "Highly Ordered Anodic Porous Alumina Formation by Self-Organized Anodizing"; *Nanostructured materials in Electrochemistry*; 2008.

Wang, et al., "Preparation of photonic crystals made of air pores in anodic alumina"; *Nanotechnology*; 18 (2007).

Yoo, et al., "Three-dimensional alumina nanotemplate", *Electrochim. Acta.*, 51, 17, 3543, (2006).

Zhu, et al., "Improved light extraction efficiency of cerium-doped lutetium-yttrium oxyorthosilicate scintillator by monolayers of periodic arrays of polystyrene spheres"; *Applied Physics Letters*; 102, 071909: 2013.

\* cited by examiner

PHOTONIC CRYSTAL SCINTILLATORS AND METHODS OF MANUFACTURE

PRIORITY CLAIM

The present application claims the benefit of priority of U.S. Provisional Patent Application Ser. No. 61/704,817, titled Photonic Crystal Scintillators, filed Sep. 24, 2012, which is incorporated herein by reference for all purposes.

FEDERAL RESEARCH STATEMENT

This invention was made with Government support under Contract No. DE-AC09-08SR22470, awarded by the U.S. Department of Energy. The Government has certain rights in the invention.

FIELD OF THE INVENTION

The present disclosure is generally directed to photonic crystal scintillators and detectors employing photonic crystal scintillators. More particularly, the present disclosure is directed to photonic crystal scintillators manufactured using an anodized alumina membrane mask.

BACKGROUND OF THE INVENTION

Certain materials when struck by an incoming charged particle or ionizing radiation will "scintillate" or re-emit the absorbed energy in the form of light (i.e. photons). A scintillation-based detector can use a light sensor to absorb the light re-emitted from the scintillating material (i.e. the scintillator), producing electrical signals that provide specific information regarding the particle or ionizing radiation that struck the scintillator.

Scintillation-based detectors can be used in a variety of nuclear fuel cycle and homeland security applications. Some examples of systems where scintillation-based detectors are used include non-intrusive interrogation in portal and border monitors, content interrogation of shipping containers, nuclear material accountancy and nuclear safeguards verifications. Further examples of the capabilities and benefits of scintillation-based detectors include identifying contraband material while reducing the time required for such identification; providing rapid isotopic and spectroscopic information for non-destructive assay of dry cask storage systems for spent nuclear fuel; detecting weak radionuclide signals through the multi-purpose stainless steel canisters used for transportation and storage; determining breaches in nuclear fuel cladding; and identification of gamma ($\gamma$) emitting signatures in spent nuclear fuel facilities and reprocessing facilities as means of verification in the plutonium fuel cycle.

Furthermore, scintillation-based detectors can also be used in model medical imaging modalities as converters for x-rays and gamma ($\gamma$) radiation, thereby obtaining information about the interior of the body. Some examples of medical applications using scintillation-based detectors include x-ray imaging, computerized tomography, and positron emission tomography scanning systems.

Enhanced sensitivity of scintillation-based detectors can be accomplished by improving the energy resolution ($\Delta E$) and timing resolution ($\Delta t$) of the detector. Optimal $\Delta E$ of a scintillation-based detector can be achieved with maximized photon yields and higher photoelectric cross sections ($\sigma_{pe}$) which result in higher probabilities of the scintillator capturing incoming radiation.

As $\sigma_{pe}$ exhibits a generally proportional relationship to the effective atomic number ($Z_{eff}$) of the scintillator, heavier and denser materials result in a higher number of photoelectrons ($N_{pe}$) registered during the scintillation event. As a result, most of the scintillators used in scintillation-based detectors have high densities and high effective atomic numbers.

However, heavy materials generally exhibit high refractive indices (e.g. $n_1 \sim 1.8$-$2.4$) relative to the ambient medium, which is typically an air tight enclosure ($n_2=1$) or grease ($n_2 \sim 1.3$). In such cases, the angle of total reflection ($\theta_{tot}$) will be relatively small. Therefore, only a limited fraction, for example about 10 to 30 percent, of the re-emitted light is able to outcouple to the scintillator surface at which a photomultiplier tube (PMT) or other light sensor can be located. Further, total internal reflection in the scintillator material deteriorates the detector's sensitivity for low count events and increases the statistical spread of the collected photons.

The use of photonic crystal structures in association with the scintillators can allow for more efficient light extraction from the scintillator surface. In particular, photonic crystals can provide two-dimensional periodic patterns that increase the percentage of re-emitted light that is able to outcouple. For example, periodic diffraction gratings can inhibit the propagation of the emitted light along directions transverse and longitudinal to the surface, thereby creating a photonic band gap. Such an optical band gap can serve to minimize total internal reflection for light waves with incident angles ($\theta i$) larger than a total critical angle of total reflection ($\theta tot$).

As an example, FIG. 1 depicts enhanced light outcoupling provided by a photonic crystal scintillator 112. More particularly, scintillator 102 has a flat geometric structure at its interface with region 104 (e.g. air, grease, or vacuum). Therefore, light reemitted by scintillator 102 that approaches the interface at an incident angle larger than the total critical angle generally does not outcouple. On the other hand, photonic crystal scintillator 112 has a two-dimensional periodic pattern (e.g. repeating features such as 108 and 110) that increase the percentage of re-emitted light that is able to outcouple. In particular, light approaching at an incident angle larger than the total critical angle of scintillator 102 exhibits increased outcoupling and can therefore be observed by light sensor 106 (e.g. a photodiode, photomultiplier tube, or other light sensor).

Thus, redistribution of the saved energy can lead to enhanced light extraction from the patterned surface coupled to the light sensor. As an example, Monte Carlo simulations have shown that applying photonic structures to various scintillator materials can enhance light yields between 90 to 110 percent.

In some respects, a photonic band gap can be comparable to a semiconductor's electronic band gap arising from the interaction of the electron wavefunction with a crystalline periodic atomic lattice. In particular, Maxwell's equations can be applied to model the interaction of electromagnetic waves in photonic crystals. A more thorough derivation of these equations in a 2-D periodic dielectric media is described in J. D. Joannopoulos, S. G. Johnson, J. N. Winn, R. D. Meade, "Photonic Crystals: Molding the Flow of Light," Princeton UP, 2008 and M. Skorobogatiy and J. Yang, "Fundamentals of Photonic Crystal Guiding," Cambridge UP, 2009.

In this derivation, the third and fourth Maxwell equations are evaluated at a fixed frequency of propagation ($\omega$) yielding an eigenfunction for the harmonic modes of the magnetic field component, as set forth in Equation 1 below:

$$\vec{\nabla} \times \frac{1}{\varepsilon} \vec{\nabla} \times \vec{H} = \left(\frac{\omega}{c}\right)^2 \vec{H} \qquad \text{(Equation 1)}$$

The corresponding solutions to this equation have the form of Equation 2 with eigenvalues $\omega_n(\vec{k})$, where $\vec{H}_{n,\vec{k}}$ is a periodic envelope function satisfying Equation 3.

$$\vec{H}(\vec{x}) = e^{i\vec{k}\cdot\vec{x}} \vec{H}_{n,\vec{k}}(\vec{x}) \qquad \text{(Equation 2)}$$

$$(\vec{\nabla}+i\vec{k}) \times \frac{1}{\varepsilon}(\vec{\nabla}+i\vec{k}) \times \vec{H}_{n,\vec{k}} = \left(\frac{\omega_n(\vec{k})}{c}\right)^2 \vec{H}_{n,\vec{k}} \qquad \text{(Equation 3)}$$

In a photonic crystal structure, the dielectric constant ($\in$) is a function of position. For example, $\in(\vec{x})=\in(\vec{x}+R_i)$ where $R_i$ are lattice vectors for an array in two dimensions. Thus, Equation 2 can result in a different eigensolution for each wave vector (k) of the primitive unit cell of the photonic crystal. Since the lattice structure is periodic, there will be discrete eigenvalues $\omega_n(\vec{k})$ that are continuous functions of k and form bands when plotted as a dispersion relation or band diagram.

This periodicity further allows consideration of only the non-equivalent wave vectors close to the k=0 origin, which is called the first Brillouin zone of the dispersion relation. Further simplification leads to an irreducible Brillouin zone (ΓMKΓ) that is the smallest region in first Brillouin zone for which the eigensolutions are not related by symmetry.

A photonic band gap (PBG) is observed when Maxwell's equations are irresolvable over a range of ω for all k. Since electromagnetic fields have two types of polarization by symmetry (e.g. transverse magnetic (TM) and transverse electric (TE)), a photonic crystal may simultaneously exhibit a TM only band gap and a TE only band gap that do not overlap. However, a full band gap occurs when at least a portion of both the TM and TE band gaps overlap and propagation of both the electric and magnetic field components is prohibited.

As a rule of thumb, TE band gaps are favored in a connected vein lattice of high-$\in$ material, while TM band gaps are favored in a square lattice of isolated high-$\in$ regions. As an example, FIG. 2A depicts a connected vein lattice structure defined by regions having a low dielectric constant (e.g. 202) and connected veins (e.g. 204) having a high dielectric constant. TE band gaps are more prevalent in the photonic crystal structure depicted by FIG. 2A. As another example, FIG. 2B depicts a square lattice of high-$\in$ regions (e.g. 206) isolated within a general area having a low dielectric constant (e.g. 208). TM band gaps are more prevalent in the photonic crystal structure depicted by FIG. 2B In order to design a photonic crystal that has band gaps for both TM and TE polarizations, a compromise can be made to obtain both isolated spots and connected veins of high dielectric constant material. As an example, FIG. 2C depicts one potential solution, which includes a honeycomb structure design of air columns (e.g. 210) within a high-$\in$ substrate (e.g. 212). If the radius of the columns is large enough, the spots (e.g. 214) between the columns can approximate localized regions of high-$\in$ material. Furthermore, the spots can be connected by veins (e.g. 216) through a narrow squeeze between the columns to adjacent spots. Thus, the band structure for the lattice depicted in FIG. 2C can result in a full photonic band gap for both the TE and TM polarizations.

However, a practical method for the fabrication of large-area photonic crystal scintillators has not been developed. In particular, the primary method of fabrication explored, e-beam lithography patterning, is time consuming, expensive, and is generally not scalable to manufacture large-area photonic crystal scintillators. In addition, only a few fabrication techniques are able to overcome the diffraction limit of light to produce features in nanometer and submicron scales.

Therefore, an effective, cost-efficient, scalable method of manufacturing photonic crystal scintillators is desirable.

BRIEF DESCRIPTION OF THE INVENTION

Aspects and advantages of the invention will be set forth in part in the following description, or may be apparent from the description, or may be learned through practice of the invention.

One aspect of the present disclosure is directed to a method for manufacturing a photonic crystal scintillator. The method includes generating an alumina membrane by anodizing aluminum foil. The alumina membrane includes a plurality of pores arranged in a generally hexagonal lattice structure. The method includes affixing the alumina membrane adjacent to a surface of a scintillator. The method includes performing an etching technique to generate a plurality of holes in the scintillator. The plurality of holes are respectively located beneath the plurality of pores. The method includes removing the alumina membrane from the surface of the scintillator.

Another aspect of the present disclosure is directed to a method for manufacturing a photonic crystal scintillator. The method includes generating an alumina membrane by anodizing aluminum foil. The alumina membrane includes a plurality of pores arranged in a generally hexagonal lattice structure. The method includes coating a surface of a scintillator with a coating material. The method includes affixing the alumina membrane adjacent to the coating material. The method includes performing an etching technique to generate a plurality of holes in the coating material. The plurality of holes are respectively located beneath the plurality of pores. The method includes removing the alumina membrane from the coating material.

Another aspect of the present disclosure is directed to a method for manufacturing a photonic crystal scintillator. The method includes generating an alumina membrane by anodizing aluminum foil. The alumina membrane includes a plurality of pores arranged in a generally hexagonal lattice structure. The method includes affixing the alumina membrane adjacent to a surface of a scintillator. The method includes depositing a deposition material to form a plurality of pillars of the deposition material. The plurality of pillars are respectively formed within the plurality of pores. The method includes removing the alumina membrane from the surface of the scintillator.

Another aspect of the present disclosure is directed to a detector for detection of critical signatures associated with the nuclear fuel cycle. The detector includes one or more photonic crystal scintillators. Each of the one or more photonic crystal scintillators has a plurality of air columns extending into a surface of the photonic crystal scintillator. The plurality of air columns have been formed by reactive ion etching the photonic crystal scintillator while covered by an alumina membrane mask. The detector includes a light sensor configured to provide an output signal indicating an amount of light observed by the light sensor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
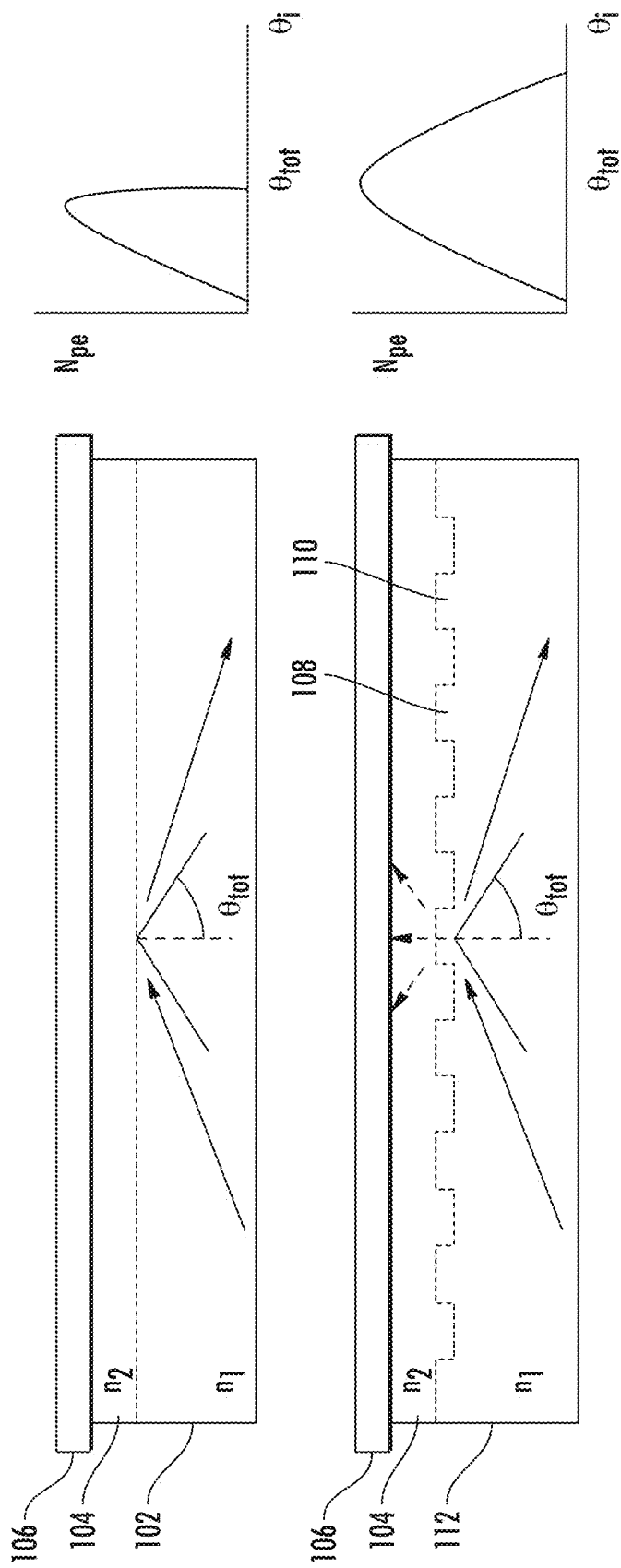
FIG. 1 depicts enhanced light outcoupling provided by a photonic crystal scintillator.
Figure 2A:
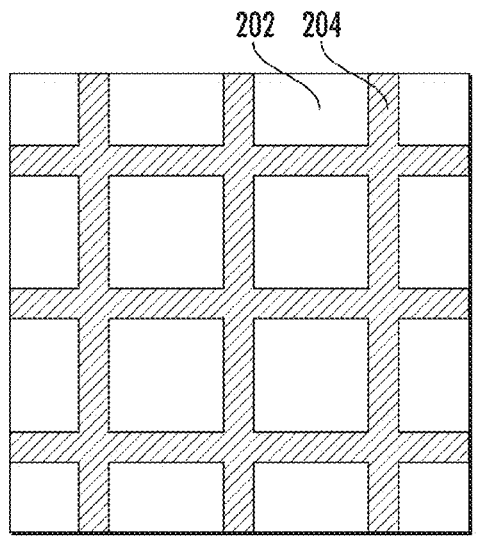
FIGS. 2A-2C depict exemplary photonic crystal structures.
Figure 2B:
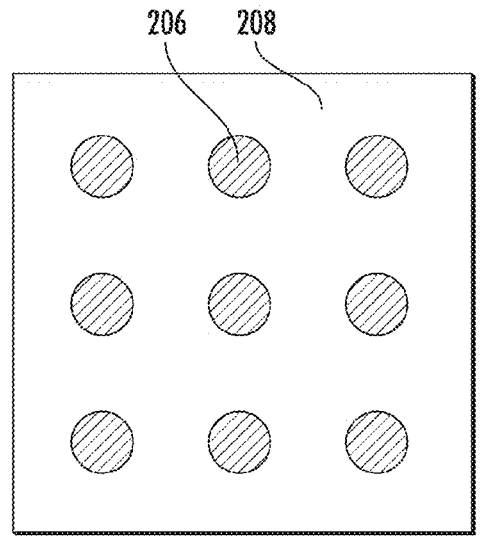
Figure 2C:
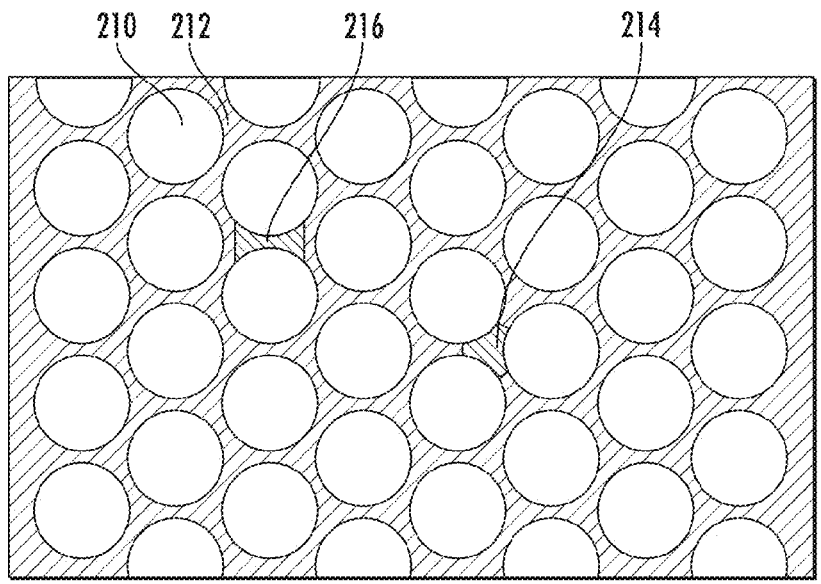

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to photonic crystal scintillators and their methods of manufacture. In particular, the present disclosure is directed to methods of manufacturing photonic crystal scintillators in which a highly-ordered porous anodic alumina membrane is used as a pattern transfer mask for either the etching of underlying material or for the deposition of additional material onto the surface of a scintillator.

Figure 3:
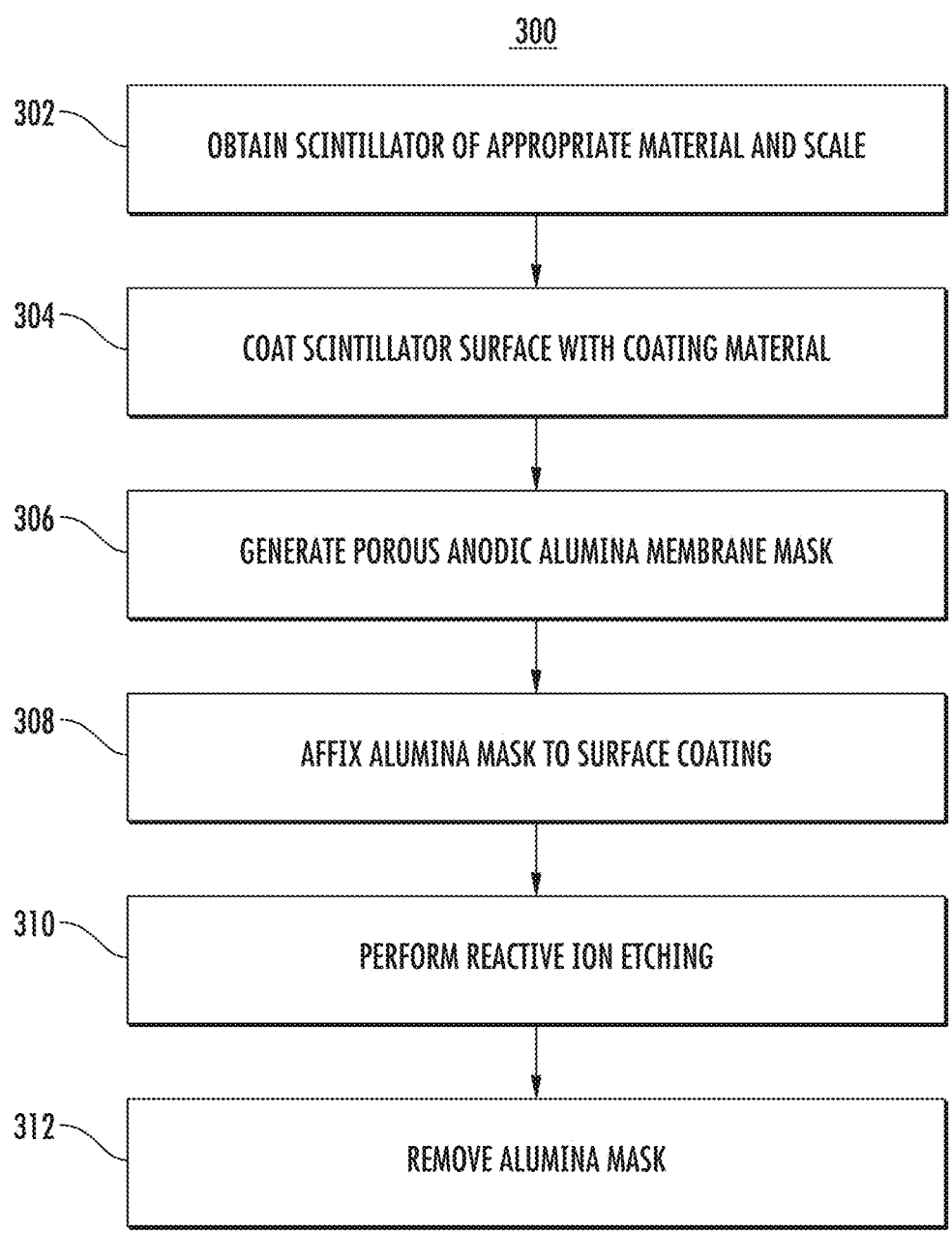
FIG. 3 depicts a flow chart of an exemplary method for manufacturing a photonic crystal scintillator according to an exemplary embodiment of the present disclosure.

With further reference to the FIGS., exemplary embodiments of the present disclosure will now be discussed in further detail. FIG. 3 depicts a flow chart of an exemplary method (300) for manufacturing a photonic crystal scintillator according to an exemplary embodiment of the present disclosure.

Although FIG. 3 depicts steps performed in a particular order for purposes of illustration and discussion, the methods of the present disclosure are not limited to such particular order or arrangement. One skilled in the art, using the disclosures provided herein, will appreciate that various steps of the method (300) can be omitted, rearranged, combined, and/or adapted in various ways without deviating from the scope of the present disclosure.

At (302) a scintillator of appropriate material and scale can be obtained. For example, the scintillator can be bismuth germinate (BGO, $Bi_4Ge_3O_{12}$; n=2.07 at emission wavelength of 480 nanometers). However, any other scintillating materials can be used as well, including, for example, NaI(Tl) or CsI(Tl) scintillators.

The size of the scintillator can be selected based on the anticipated end-use for the photonic crystal scintillator. In particular, the methods of the present disclosure provide for scalable manufacturing solutions for large-area photonic crystal scintillators. As examples, the scintillator can be 50 millimeters by 50 millimeters, 25 centimeters by 25 centimeters, or any other desirable size.

At (304) at least one surface of the scintillator can be coated with a coating material. The coating material can be a suitable material for the formation of a photonic crystal, such as dielectric materials. As an example, the coating material can be a transparent conducting oxide, such as, for example, indium tin oxide (ITO). However, other materials can be used, including aluminum, gallium, or indium-doped zinc oxides or indium-doped cadmium oxide. The coating process can be performed using any suitable technique, including, for example, sputter deposition.

A coating material can be used that has a dielectric constant substantially equal to the dielectric constant of the scintillator (e.g. minimizes a difference between the two constants), thereby minimizing scattering losses at the coating/scintillator interface. Furthermore, in some implementations, the thickness of the layer of coating material formed on the scintillator can be substantially equal to about one-half the emission wavelength of the corresponding scintillator. For example, if a BGO scintillator is used, the thickness of the layer of coating material can be about 240 nanometers. As another example, the layer of coating material can be about 200 nanometers in thickness (i.e. depth).

In addition, although method (300) includes coating the scintillator with a coating material at (304), in certain embodiments of the present disclosure, the scintillator is not coated with a coating material.

Figure 4:
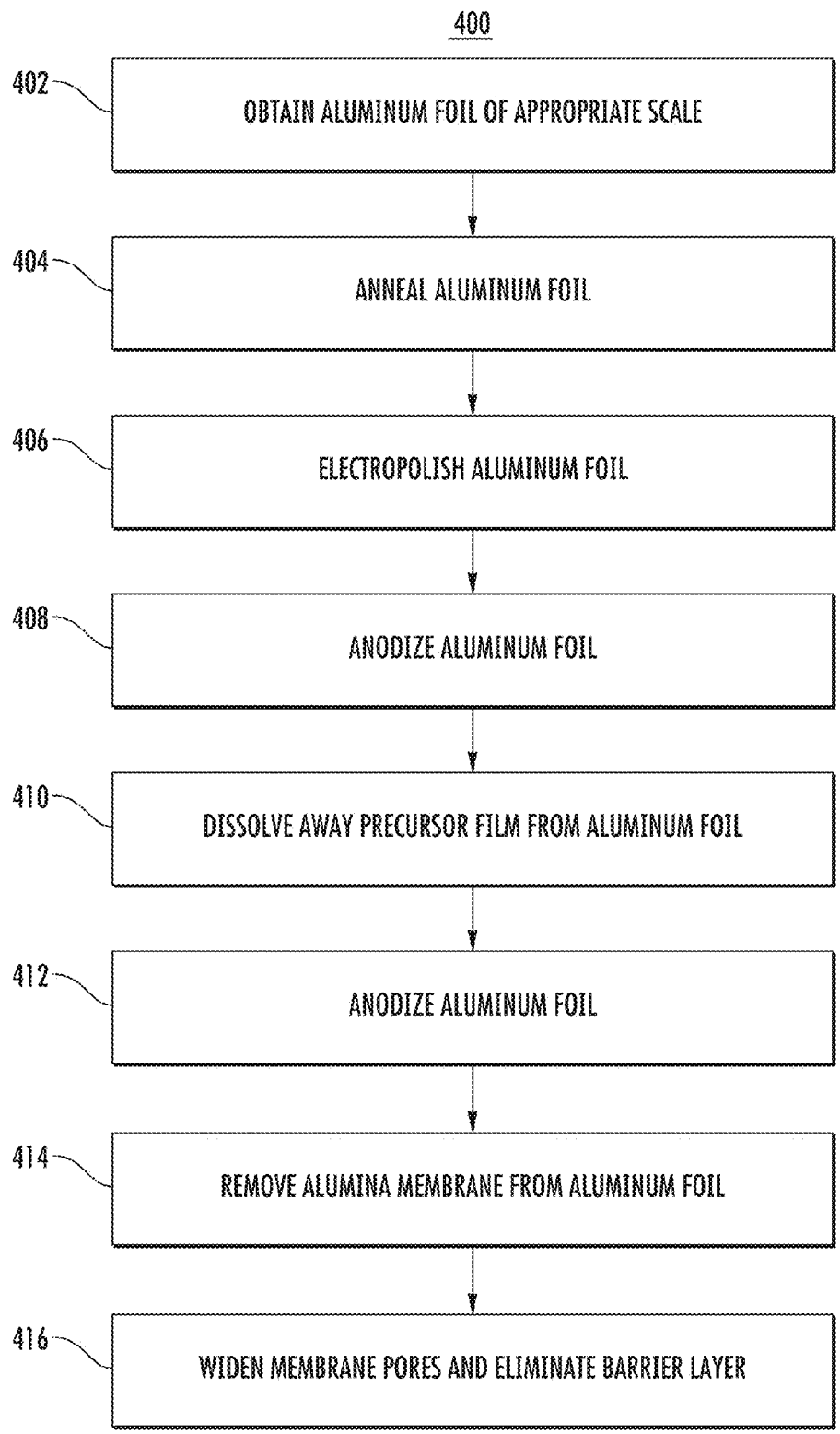
FIG. 4 depicts a flow chart of an exemplary method for generating an alumina membrane according to an exemplary embodiment of the present disclosure.

At (306) an alumina membrane can be generated. For example, the alumina membrane can be a highly-ordered porous anodic alumina membrane to be used as a mask. As an example, FIG. 4 depicts a flow chart of an exemplary method (400) for generating an alumina membrane according to an exemplary embodiment of the present disclosure. Method (400) can be performed at (306).

Further, although FIG. 4 depicts steps performed in a particular order for purposes of illustration and discussion, the methods of the present disclosure are not limited to such particular order or arrangement. One skilled in the art, using the disclosures provided herein, will appreciate that various steps of the method (400) can be omitted, rearranged, combined, and/or adapted in various ways without deviating from the scope of the present disclosure.

At (402) aluminum foil of the appropriate scale can be obtained. Generally, the size of the aluminum foil will be dictated by the size of the scintillator to be manufactured and the expected end-use. As examples, the aluminum foil can be 50 millimeters by 50 millimeters, 25 centimeters by 25 centimeters, or any other desirable size. As another example, the aluminum foil can be 0.5 to 1 millimeter in thickness or any other desirable thickness.

At (404) the aluminum foil can be annealed or otherwise heat treated. As an example, the aluminum foil can be annealed at about 400 degrees Celsius. Annealing the aluminum foil can enlarge the grain size of the aluminum foil. At (404) the aluminum foil can also optionally be sanded and rinsed with purified water. As an example, the aluminum foil can be sanded at about 600 grit.

At (406) the aluminum can be electropolished. As an example, the aluminum foil can be electropolished for about 15 to 30 minutes at about 15 volts in a solution of phosphoric acid, sulfuric acid, and/or chromium trioxide using a lead cathode. Electropolishing in such fashion can remove imperfections in the aluminum foil.

Figure 11:
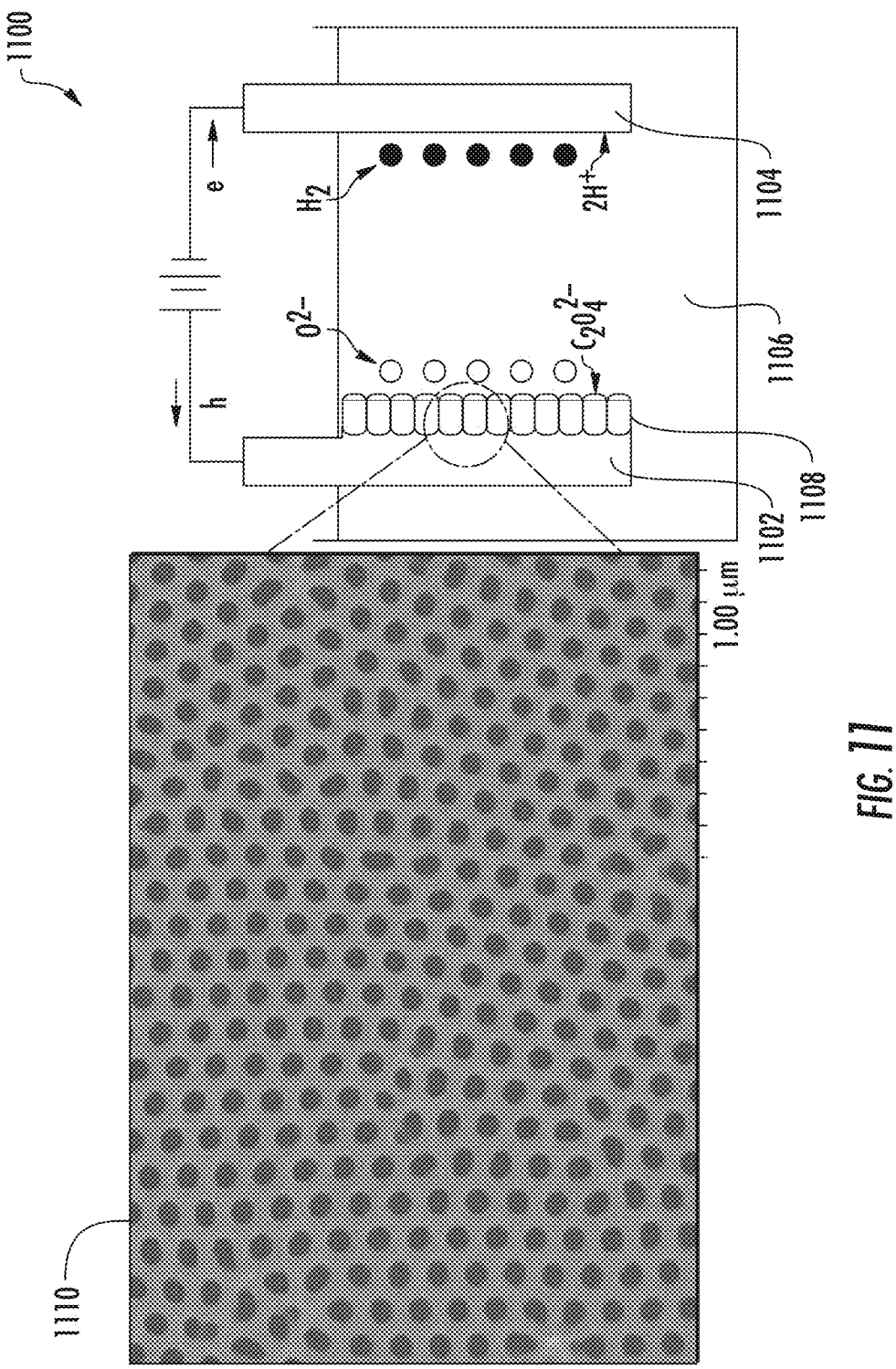
FIG. 11 depicts a diagram of an exemplary anodization process according to an exemplary embodiment of the present disclosure.

At (408) the aluminum foil can be anodized for a first time period. As an example, FIG. 11 depicts a diagram 1100 of an exemplary anodization process according to an exemplary embodiment of the present disclosure. In particular, the aluminum foil can be treated as an anode 1102 by providing an electrical potential between the anode 1102 and a cathode 1104 while submerged in a solution 1106.

As an example, cathode 1104 can be a stainless steel plate and a voltage of about 195 to 200 volts can be provided between anode 1102 and cathode 1104 for about 15 to 48 hours at temperatures less than 25 degrees Celsius. For example, the anodization can be performed at about 1 to 2 degrees Celsius. Solution 1106 can include oxalic acid, phosphoric acid, or sulfuric acid.

Anodization of the aluminum foil for the first time period can result in the formation of a thick precursor alumina film 1108 on both sides of the aluminum foil. In particular, image 1110 shows alumina film 1108 in detail. As can be seen in image 1110, alumina film 1108 can include a plurality of pores arranged in a generally hexagonal lattice structure.

In addition, the electropolishing performed at (406) can be performed using a similar arrangement as is shown by diagram 1100 of FIG. 11, except that, for example, the electropolishing can be performed using a cathode of lead composition and a different electrolytic solution (e.g. phosphoric acid, sulfuric acid, and/or chromium trioxide).

Referring again to FIG. 4, at (410) the precursor film can be dissolved away from the aluminum foil. As an example, the precursor film can be dissolved away using an aqueous solution of phosphoric acid and chromium trioxide at temperatures of about 60 to 80 degrees Celsius. The dissolution at (410) can be performed for about 2 to 3 hours to completely remove the precursor film.

After the precursor film is dissolved at (410), a pattern of scallops can be present on both surfaces of the aluminum foil. The pattern of scallops can be a pretexture pattern for the alumina membrane resulting from method (400). As such, it will be appreciated that the voltage potential, acid type, concentration of acid, temperature, or other variables of the anodization process performed at (408) can be varied based on design goals or to achieve desired membrane parameters, such as, for example, a lattice constant or a pore radius.

At (412) the aluminum foil can be anodized for a second time period. For example, the anodization at (412) can be carried out at the same conditions as the anodization performed at (408) and using the arrangement generally shown by diagram 1100 of FIG. 11. The duration of the second time period can be varied to control the thickness of the resulting alumina membrane. As an example, a second anodization period of 10 minutes for an oxalic acid anodization at 2 degrees Celsius can yield an alumina membrane about 1 micrometer in thickness.

However, anodization times and other parameters can be adjusted until an oxide layer of greater than 10 micrometers is grown, such that the alumina membrane is self-supporting. For example, the alumina membrane can be grown to about 15 to 50 micrometers in thickness.

At (414) the alumina membrane can be removed from the aluminum foil. As an example, at (414) the aluminum foil can be preferentially etched in a copper chloride aqueous solution of hydrochloric acid. As another example, the aluminum foil can be reacted with a mercury chloride solution. For example, the mercury chloride solution can be less than 1 percent by weight.

At (416) the alumina membrane pores can be widened and a barrier layer of the alumina membrane can be eliminated. As an example, at (416) the alumina membrane can be placed in a dilute phosphoric acid solution to widen the pores of the alumina membrane and remove the barrier layer adjacent to the aluminum substrate. For example, the dilute phosphoric acid solution can be less than 10 percent by weight.

It will be understood, however, that the duration of the acid exposure and the concentration of the acid solution can be varied to increase or decrease the amount by which the pores are widened at (416). Further, in certain circumstances, such variables can be determined based on a desired pore radius.

Figure 5A:
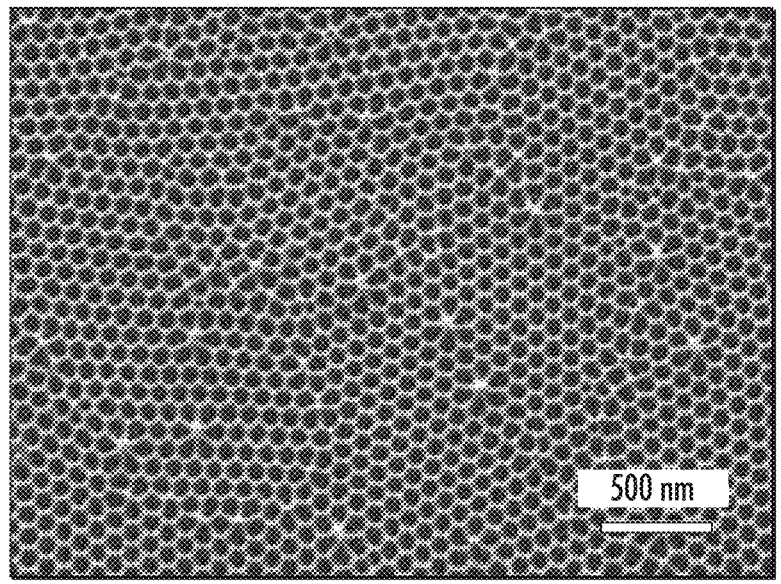
FIGS. 5A and 5B depict exemplary alumina membranes according to exemplary embodiments of the present disclosure.
Figure 5B:
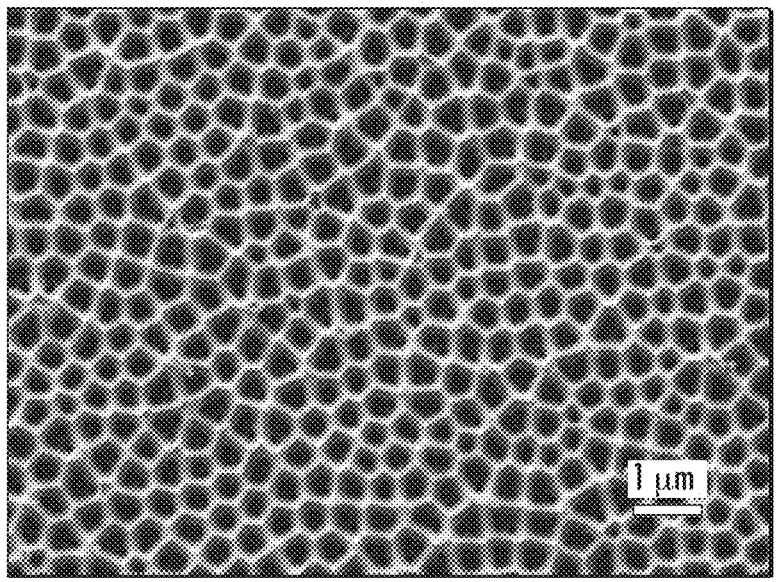

FIGS. 5A and 5B depict exemplary alumina membranes 500 and 550 according to exemplary embodiments of the present disclosure. In particular, alumina membranes 500 and 550 represent exemplary alumina membranes that can be formed by performing method (400).

Alumina membrane 500 is the result of performing the anodization steps of method (400) in an oxalic acid solution. Alumina membrane 550 is the result of performing the anodization steps of method (400) in a phosphoric acid solution. As can be seen from FIGS. 5A and 5B, both alumina membrane 500 and alumina membrane 550 exhibit a generally hexagonal lattice structure.

Returning again to FIG. 3, after the alumina membrane mask is generated at (306), the alumina mask can be affixed adjacent to the surface coating material at (308). As an example, at (308) the coating material can be wetted and the alumina membrane can be laid on top of the coating material. For example, van der waals forces can be relied upon to hold the alumina membrane in place.

As another example, the alumina membrane can be affixed to the coating material at (308) by performing spin coating. For example, the alumina membrane can be laid upon the coating material and a small amount of a diluted polymer can be placed upon the membrane and spun outwards. The diluted polymer can be a diluted poly(methyl methacrylate) solution.

As yet another example, the alumina membrane can be affixed to the coating material at (308) by applying a silver paint to at least a portion of the perimeter of the alumina membrane. For example, the alumina membrane can be laid upon the coating material and silver paint can be applied around a perimeter of the membrane or to the edges of the membrane.

In embodiments in which a coating material was not applied to the scintillator surface at (304), then at (308) the alumina membrane can be affixed directly adjacent to the scintillator surface. For example, any of the methods discussed above can be performed to affix the alumina membrane adjacent to the scintillator surface.

At (310) reactive ion etching can be performed to generate a plurality of holes in the coating material. As an example, parallel-plate reactive ion etching using a chlorinated, brominated, or fluorinated gas plasma can be performed at (310). However, other suitable etching techniques can alternatively be performed at (310) as well.

More particularly, the plurality of holes generated by the etching at (310) can respectively correspond to the plurality of pores of the alumina membrane. For example, the alumina membrane can act as a pattern transfer mask such that the plurality of holes generated by the etching process are respectively located beneath the plurality of pores of the alumina membrane. It will be appreciated that creation of such holes results in a periodic pattern of material on at least one surface of the scintillator, thereby creating a photonic crystal scintillator.

The etching technique can be performed for a duration sufficient to generate holes generally equivalent to the thickness of the coating layer. However, other hole depths can be generated as well, including hole depths larger or smaller than the thickness of the coating layer. In certain circumstances, the holes can be air columns that extend into the coating material in a parallel depth-wise fashion.

In addition, in embodiments in which a coating material was not applied to the scintillator surface at (304), then at (310) the etching technique can generate holes extending directly into the scintillator body. Any of the etching techniques discussed above can be performed in such embodiments as well.

At (312) the alumina membrane can be removed from the photonic crystal scintillator. As an example, the alumina membrane can be removed by dissolving the membrane in a dilute sodium hydroxide solution or a dilute phosphoric acid solution. As another example, the alumina membrane can be removed with physical force, such as, for example, peeling the membrane off of the photonic crystal scintillator.

Figure 6:
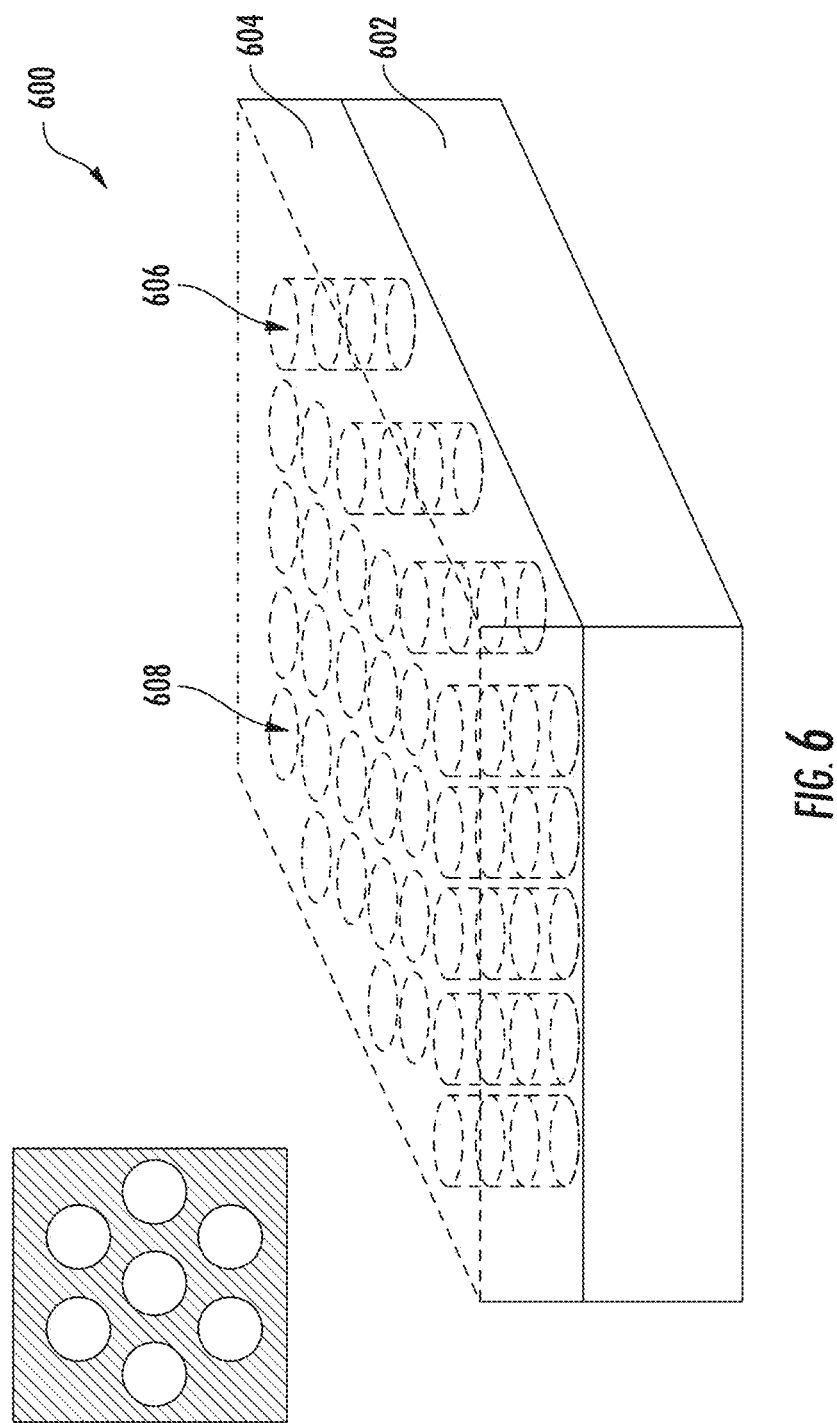
FIG. 6 depicts an exemplary photonic crystal scintillator according to an exemplary embodiment of the present disclosure.

FIG. 6 depicts an exemplary photonic crystal scintillator 600 according to an exemplary embodiment of the present disclosure. In particular, photonic crystal scintillator 600 represents an exemplary photonic crystal scintillator that can be manufactured by performing method (300).

Photonic crystal scintillator 600 can include a scintillator body 602 and a coating material 604. A plurality of holes can extend into coating material 604. For example, the plurality of holes can be a plurality of air columns such as air columns 606 and 608. The plurality of air columns can be arranged in a generally hexagonal lattice structure.

Furthermore, in embodiments of the present disclosure in which the scintillator is not coated with a coating material prior to the performance of an etching technique, the plurality of air columns can extend directly into the scintillator body.

It will be appreciated that the depiction of photonic crystal scintillator 600 provided in FIG. 6 is for the purposes of illustration and explanation and is not to scale. More particularly, the dimensions of the photonic crystal scintillators of the present disclosure can be varied to meet various design goals or achieve desired parameters. For example, the emission wavelength of the scintillating material used will impact various parameters of the photonic crystal scintillator, including, for example, the radius of the plurality of holes, the lattice constant of the plurality of holes, and the thickness and identity of coating material 604.

Figure 7:
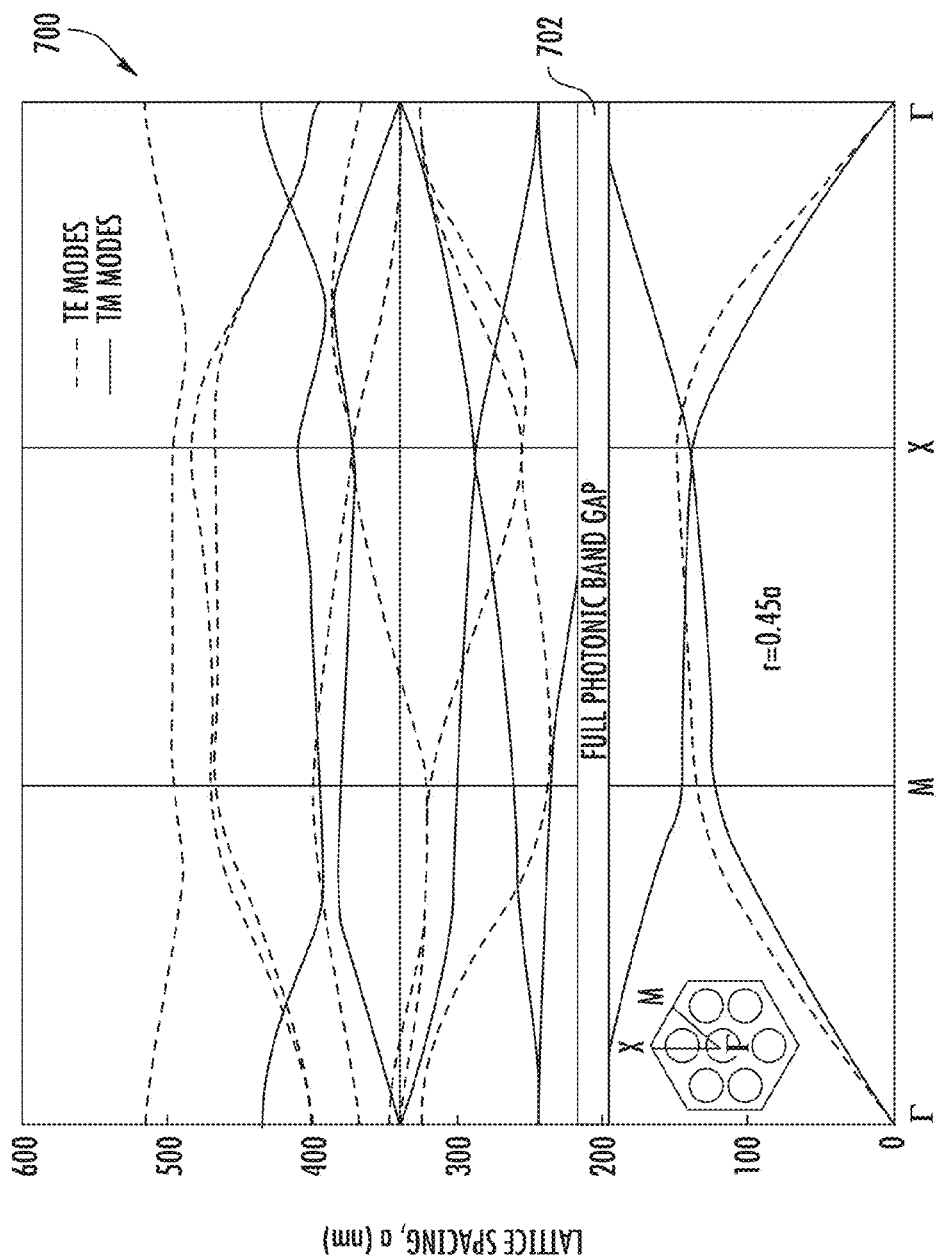
FIG. 7 depicts an exemplary dispersion relation according to an exemplary embodiment of the present disclosure.

As an example, in the case that scintillator 602 is bismuth germinate and coating material 604 is indium tin oxide, photonic crystal scintillator 600 can be designed to have a lattice constant of about 210 nanometers, a hole radius of about 95 nanometers, and a thickness of coating material 604 of about 200 to 240 nanometers. In particular, FIG. 7 depicts an exemplary dispersion relation 700 according to an exemplary embodiment of the present disclosure.

Dispersion relation 700 shows dispersion relations for a photonic crystal scintillator made of bismuth germinate and having a plurality of holes arranged in a generally honeycomb or hexagonal lattice structure. As can be seen from dispersion relation 700, a full photonic band gap 702 can be achieved using a lattice constant (a) from about 200 to 210 nanometers. Using a hole radius (r) of r=0.45a, dependent upon the lattice constant, full photonic band gap 702 can be achieved using a hole radius from about 90 nanometers to about 95 nanometers. It will be appreciated that dispersion relation 700 is exemplary in nature and does not limit the photonic crystal scintillators of the present disclosure to the parameter values shown.

Figure 8:
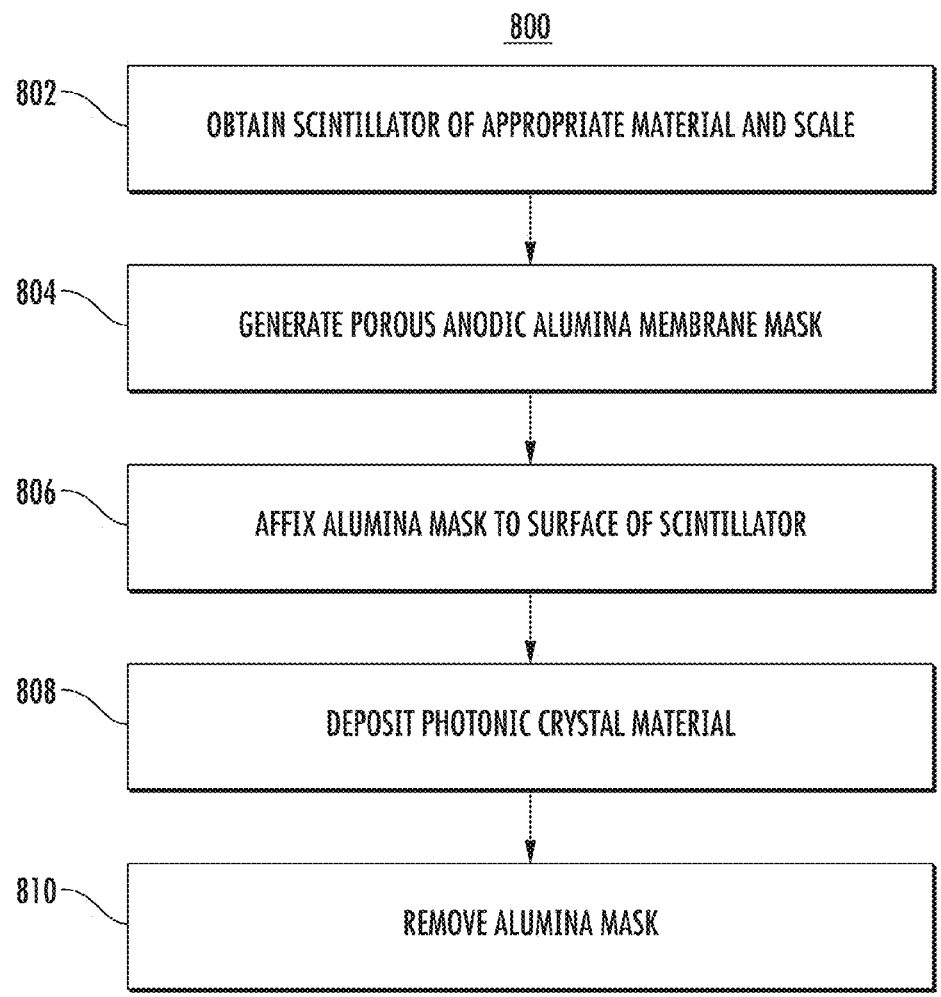
FIG. 8 depicts a flow chart of an exemplary method for manufacturing a photonic crystal scintillator according to an exemplary embodiment of the present disclosure.

FIG. 8 depicts a flow chart of an exemplary method (800) for manufacturing a photonic crystal scintillator according to an exemplary embodiment of the present disclosure. Although FIG. 8 depicts steps performed in a particular order for purposes of illustration and discussion, the methods of the present disclosure are not limited to such particular order or arrangement. One skilled in the art, using the disclosures provided herein, will appreciate that various steps of the method (800) can be omitted, rearranged, combined, and/or adapted in various ways without deviating from the scope of the present disclosure.

At (802) a scintillator of appropriate material and scale can be obtained. For example, the scintillator can be bismuth germinate. However, any other scintillating materials can be used as well, including, for example, NaI(TI) or CsI(TI) scintillators. The size of the scintillator can be selected based on the anticipated end-use for the photonic crystal scintillator. As examples, the scintillator can be 50 millimeters by 50 millimeters, 25 centimeters by 25 centimeters, or any other desirable size.

At (804) an alumina membrane can be generated. For example, the alumina membrane can be a highly-ordered porous anodic alumina membrane to be used as a pattern transfer mask. As an example, at (804) the alumina membrane can be generated according to method (400) of FIG. 4.

At (806) the alumina membrane can be affixed adjacent to a surface of the scintillator. As an example, at (806) the surface of the scintillator can be wetted and the alumina membrane can be laid on top of the coating material. For example, van der waals forces can be relied upon to hold the alumina membrane in place.

As another example, the alumina membrane can be affixed to the scintillator at (806) by performing spin coating. For example, the alumina membrane can be laid upon the scintillator and a small amount of a diluted polymer can be placed upon the membrane and spun outwards. The diluted polymer can be a diluted poly(methyl methacrylate) solution.

As yet another example, the alumina membrane can be affixed to the scintillator at (806) by applying a silver paint to at least a portion of the perimeter of the alumina membrane. For example, the alumina membrane can be laid upon the scintillator and silver paint can be applied around a perimeter of the membrane or to the edges of the membrane.

Further, in certain embodiments of the present disclosure, a layer of coating material can be applied to the surface of the scintillator prior to affixing the alumina mask to the surface of the scintillator. The coating material can be a transparent conducting oxide with a similar refractive index to the scintillator. For example, the coating material can be indium tin oxide. However, other materials can be used, including aluminum, gallium, or indium-doped zinc oxides or indium-doped cadmium oxide.

At (808) a deposition material can be deposited onto the scintillator to form a photonic crystal. As an example, the deposition material can be deposited using sputter deposition, e-beam deposition, physical vapor deposition, or other suitable deposition techniques. The deposition material can be the same material as the scintillator or can be a different material, such as a transparent conducting oxide with a similar refractive index to the scintillator. For example, the deposition material can be indium tin oxide. However, other materials can be used, including aluminum, gallium, or indium-doped zinc oxides or indium-doped cadmium oxide.

More particularly, depositing the deposition material at (808) can result in the formation of a plurality of pillars of the deposition material on the surface of the scintillator. In particular, the plurality of pillars can be respectively formed within the plurality of pores of the alumina membrane. Thus, the plurality of pillars can be arranged to form a generally hexagonal lattice structure. It will be appreciated that creation of such pillars results in a periodic pattern of material on at least one surface of the scintillator, thereby creating a photonic crystal scintillator.

The deposition technique can be performed for a duration sufficient to generate pillars of any suitable height. In addition, in embodiments in which a coating material is applied to the scintillator surface prior to deposition, then the pillars will be formed on the coating material instead of the scintillator body.

At (810) the alumina membrane can be removed from the photonic crystal scintillator. As an example, the alumina membrane can be removed by dissolving the membrane in a dilute sodium hydroxide solution or a dilute phosphoric acid solution. As another example, the alumina membrane can be removed with physical force, such as, for example, peeling the membrane off of the photonic crystal scintillator.

Figure 9:
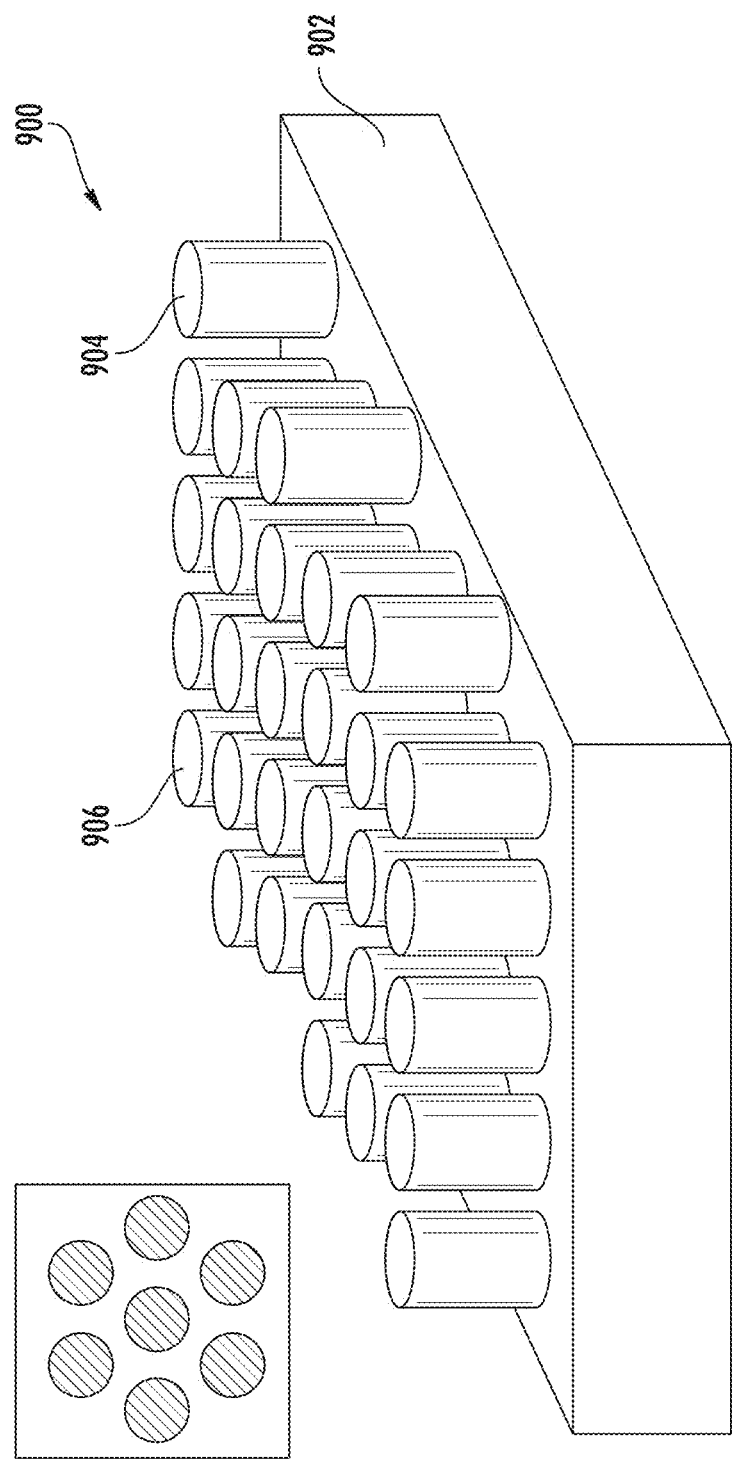
FIG. 9 depicts an exemplary photonic crystal scintillator according to an exemplary embodiment of the present disclosure.

FIG. 9 depicts an exemplary photonic crystal scintillator 900 according to an exemplary embodiment of the present disclosure. In particular, photonic crystal scintillator 900 represents an exemplary photonic crystal scintillator that can be manufactured by performing method (800).

Photonic crystal scintillator 900 can include a scintillator body 902 and a plurality of pillars of deposition material, such as, for example, pillars 904 and 906. The plurality of pillars can be arranged in a generally hexagonal lattice structure.

It will be appreciated that the depiction of photonic crystal scintillator 900 provided in FIG. 9 is for the purposes of illustration and explanation and is not to scale. More particularly, the dimensions of the photonic crystal scintillators of the present disclosure can be varied to meet various design goals or achieve desired parameters. For example, the emission wavelength of the scintillating material used will impact various parameters of the photonic crystal scintillator, including, for example, the radius of the plurality of pillars, the lattice constant of the plurality of pillars, the height of the plurality of pillars, and identity of the deposition material. As an example, in the case that scintillator 902 is bismuth germinate, photonic crystal scintillator 900 can be designed to have a lattice constant of about 210 nanometers, a pillar radius of about 95 nanometers, and a pillar height of about 200 to 240 nanometers.

Figure 10:
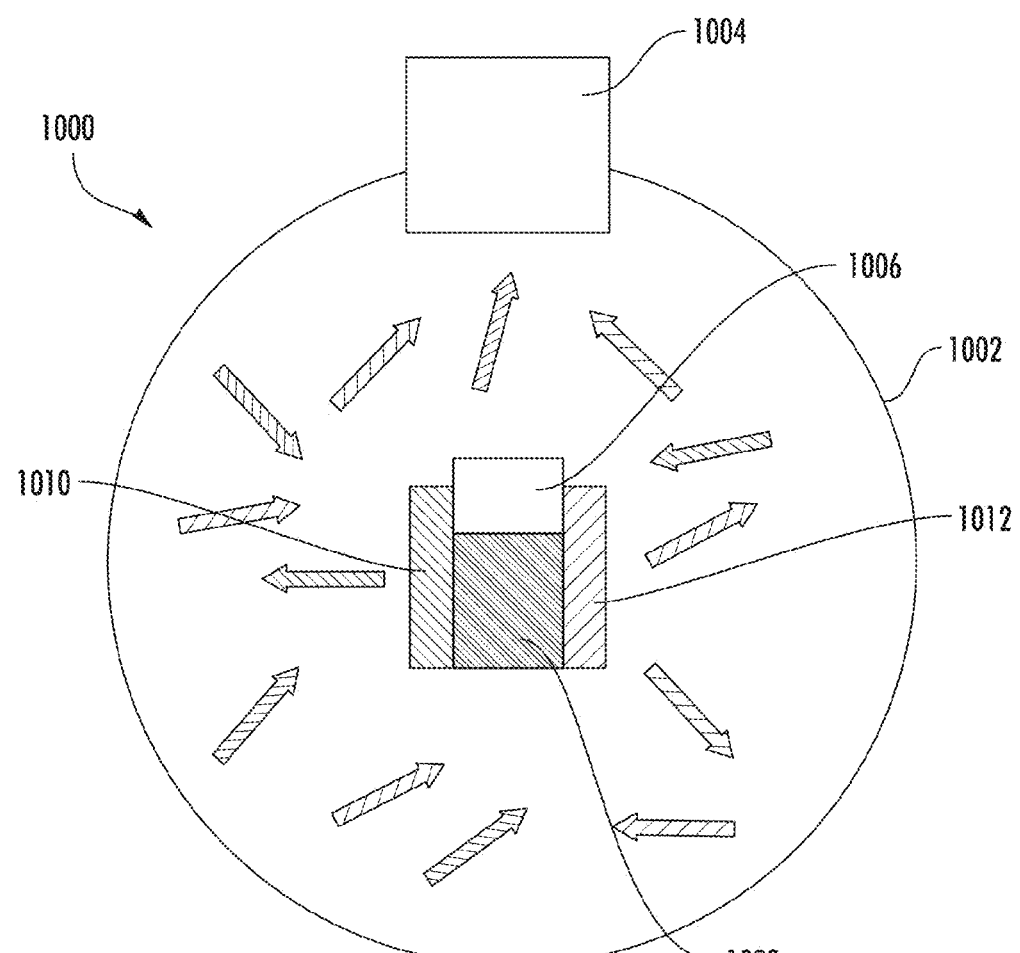
FIG. 10 depicts an exemplary detector according to an exemplary embodiment of the present disclosure.

FIG. 10 depicts an exemplary detector 1000 according to an exemplary embodiment of the present disclosure. In certain embodiments, detector 1000 can be used in a spectrophotometer system for the detection and identification of critical signatures of the nuclear fuel cycle (e.g. $^{241}$Am and $^{243}$Cm)

Detector 1000 includes an integrating sphere 1002 and a light sensor 1004. The interior surface of integrating sphere 1002 can be coated with a reflective material. Light sensor 1004 can be any suitable sensing device for providing an output signal describing an amount of light observed by light sensor 1004. For example, light sensor 1004 can be a photodiode, photomultiplier tube, or other light sensing device. The output signal provided by light sensor 1004 can be provided to a computing device for interpretation.

Interior to integrating sphere 1002 can be a sample chamber 1006. Sample chamber 1006 can be configured to hold or contain a sample 1008. For example, sample chamber 1006 can include a cuvette holding a liquid sample containing gamma ray, x-ray, or neutron emitting radionuclides. However, in some embodiments, sample 1008 can be a solid material.

Sample chamber can include a first window 1010 and a second window 1012. First window 1010 can include a first photonic crystal scintillator and second window 1012 can include a second photonic crystal scintillator. The first and second photonic crystal scintillators can have been manufactured according to any of the manufacturing methods disclosed herein.

The first photonic crystal scintillator can be positioned so that the periodic photonic crystal patterning is facing towards an exterior of the first window 1010. Likewise, the second photonic crystal scintillator can be positioned so that the period photonic crystal patterning is facing towards an exterior of the second window 1012. In such fashion, energy emissions from sample 1008 can be transformed into light by the photonic crystal scintillators and then outcoupled away from sample chamber 1006 and into integrating sphere 1002 such that the emitted light is received by light sensor 1004.

Furthermore, in some embodiments, the first and second photonic crystal scintillators can be manufactured from differing scintillating materials. Thus, the first and second photonic crystal scintillators can have differing properties, such as differing emission wavelengths. According to an aspect of the present disclosure, various parameters of each of the photonic crystal scintillators can be optimized according to the particular emission wavelength associated with such photonic crystal scintillators. Thus, for example, the first and second photonic crystal scintillators may have differing lattice constants, pillar radii, pillar height, air column radii, air column depth, photonic crystal material, or other suitable parameters.

Thus, detector 1000 can include a plurality of photonic crystal scintillators having differing properties and attributes, including, for example, differing emission wavelengths. As such, detector 1000 can simultaneously detect or identify a plurality of critical signatures or other attributes of a single sample 1008. In addition, detector 1000 can be portable, hand-held, or other shapes and sizes.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a photonic crystal scintillator, the method comprising:
   generating an alumina membrane by anodizing aluminum foil, wherein the alumina membrane comprises a plurality of pores arranged in a generally hexagonal lattice structure;
   affixing the alumina membrane adjacent to a surface of a scintillator;
   performing an etching technique to generate a plurality of holes in the scintillator, wherein the plurality of holes are respectively located beneath the plurality of pores; and
   removing the alumina membrane from the surface of the scintillator;
   coating the surface of the scintillator with a coating material prior to affixing the alumina membrane;
   wherein affixing the alumina membrane adjacent to the surface of the scintillator comprises affixing the alumina membrane adjacent to the coating material;
   wherein performing the etching technique to generate the plurality of holes in the scintillator comprises performing the etching technique to generate the plurality of holes in the coating material; and
   wherein removing the alumina membrane from the surface of the scintillator comprises removing the alumina membrane from the coating material;
   wherein the coating material forms a layer having a thickness substantially equal to one-half of an emission wavelength associated with the scintillator.

2. The method of claim 1, wherein the scintillator comprises bismuth germinate and the coating material comprises indium tin oxide.

3. The method of claim 1, wherein the plurality of pores arranged in the generally hexagonal lattice structure generally exhibit a lattice constant of about 210 nanometers and a pore radius of about 95 nanometers.

4. The method of claim 1, wherein affixing the alumina membrane adjacent to the coating material comprises:
   placing the alumina membrane adjacent to the coating material; and
   spin coating the alumina membrane with a layer of polymer.

5. The method of claim 1, wherein affixing the alumina membrane adjacent to the coating material comprises:
   placing the alumina membrane adjacent to the coating material; and
   applying a silver paint to at least a portion of the perimeter of the alumina membrane.

6. The method of claim 1, wherein the etching technique comprises a parallel-plate reactive ion etching technique.

7. The method of claim 1, wherein removing the alumina membrane from the coating material comprises dissolving the alumina membrane is a dilute sodium hydroxide solution.

8. A method for manufacturing a photonic crystal scintillator, the method comprising:
   generating an alumina membrane by anodizing aluminum foil, wherein the alumina membrane comprises a plurality of pores arranged in a generally hexagonal lattice structure;
   affixing the alumina membrane adjacent to a surface of a scintillator;
   performing an etching technique to generate a plurality of holes in the scintillator, wherein the plurality of holes are respectively located beneath the plurality of pores; and
   removing the alumina membrane from the surface of the scintillator;
   coating the surface of the scintillator with a coating material prior to affixing the alumina membrane;
   wherein affixing the alumina membrane adjacent to the surface of the scintillator comprises affixing the alumina membrane adjacent to the coating material;
   wherein performing the etching technique to generate the plurality of holes in the scintillator comprises performing the etching technique to generate the plurality of holes in the coating material; and
   wherein removing the alumina membrane from the surface of the scintillator comprises removing the alumina membrane from the coating material;
   wherein the coating material has a dielectric constant substantially equal to the dielectric constant of the scintillator;
   wherein generating the alumina membrane by anodizing aluminum foil comprises:
   anodizing the aluminum foil for a first period;
   removing a precursor film from the aluminum foil after the first period;
   anodizing the aluminum foil for a second period;
   separating the alumina membrane from the aluminum foil after the second period; and
   exposing the alumina membrane to an acid solution to widen the plurality of pores and eliminate a barrier layer of the alumina membrane;
   wherein:
   anodizing the aluminum foil for the first period comprises anodizing the aluminum foil for about 15 to 48 hours at about 195 to 200 volts and at about 1 to 2 degrees Celsius; and
   anodizing the aluminum foil for the second period comprises anodizing the aluminum foil at about 195 to 200 volts and at about 1 to 2 degrees Celsius.

9. A method for manufacturing a photonic crystal scintillator, the method comprising:
   generating an alumina membrane by anodizing aluminum foil, wherein the alumina membrane comprises a plurality of pores arranged in a generally hexagonal lattice structure;
   affixing the alumina membrane adjacent to a surface of a scintillator;
   performing etching technique to generate a plurality of holes in the scintillator, wherein the plurality of holes are respectively located beneath the plurality of pores; and
   removing the alumina membrane from the surface of the scintillator;
   coating the surface of the scintillator with a coating material prior to affixing the alumina membrane;
   wherein affixing the alumina membrane adjacent to the surface of the scintillator comprises affixing the alumina membrane adjacent to the coating material;
   wherein performing the etching technique to generate the plurality of holes in the scintillator comprises performing the etching technique to generate the plurality of holes in the coating material; and
   wherein removing the alumina membrane from the surface of the scintillator comprises removing the alumina membrane from the coating material;
   wherein the coating material has a dielectric constant substantially equal to the dielectric constant of the scintillator;
   wherein generating the alumina membrane by anodizing aluminum foil comprises:
   anodizing the aluminum foil for a first period;
   removing a precursor film from the aluminum foil after the first period;

anodizing the aluminum foil for a second period;
separating the alumina membrane from the aluminum foil after the second period; and
exposing the alumina membrane to an acid solution to widen the plurality of pores and eliminate a barrier layer of the alumina membrane;
wherein the second period is of such duration as to allow the alumina membrane to grow to a thickness of about 15 to 50 micrometers.

10. A method for manufacturing a photonic crystal scintillator, the method comprising:
generating an alumina membrane by anodizing aluminum foil, wherein the alumina membrane comprises a plurality of pores arranged in a generally hexagonal lattice structure;
affixing the alumina membrane adjacent to a surface of a scintillator;
depositing a deposition material to form a plurality of pillars of the deposition material, wherein the plurality of pillars are respectively formed within the plurality of pores, the plurality of pillars each associated with a pillar radius and a pillar height; and
removing the alumina membrane from the surface of the scintillator.

11. The method of claim 10, wherein the scintillator comprises bismuth germinate and the deposition material comprises indium tin oxide.

12. The method of claim 10, wherein generating the alumina membrane by anodizing aluminum foil comprises:
anodizing the aluminum foil for a first period;
removing a precursor film from the aluminum foil after the first period;
anodizing the aluminum foil for a second period;
separating the alumina membrane from the aluminum foil after the second period; and
exposing the alumina membrane to an acid solution to widen the plurality of pores and eliminate a barrier layer of the alumina membrane.

13. The method of claim 10, wherein affixing the alumina membrane adjacent to the surface of the scintillator comprises one of spin coating the alumina membrane with a diluted poly(methyl methacrylate) solution or applying a silver paint to at least a portion of a perimeter of the alumina membrane.

14. The method of claim 10, wherein depositing the deposition material comprises performing one of sputter deposition, e-beam deposition, or physical vapor deposition.

15. A detector for detection of critical signatures associated with the nuclear fuel cycle, the detector comprising:
one or more photonic crystal scintillators, each of the one or more photonic crystal scintillators having a plurality of air columns extending into a surface of the photonic crystal scintillator, the plurality of air columns having been formed by reactive ion etching the photonic crystal scintillator while covered by an alumina membrane mask; and
a light sensor configured to provide an output signal indicating an amount of light observed by the light sensor;
an integrating sphere surrounding the one or more photonic crystal scintillators, the integrating sphere having a reflective coating on an interior surface; and
a sample chamber interior to the integrating sphere, the sample chamber having a first window and a second window and being configured to hold a sample to be tested;
wherein the one or more photonic crystal scintillators comprises a first photonic crystal scintillator and a second photonic crystal scintillator;
wherein the first window comprises the first photonic crystal scintillator, the first photonic crystal scintillator being positioned such that the surface of the first photonic crystal scintillator into which the air columns extend is facing towards an exterior of the first window; and
wherein the second window comprises the second photonic crystal scintillator, the second photonic crystal scintillator being positioned such that the surface of the second photonic crystal scintillator into which the air columns extend is facing towards an exterior of the second window.

16. The detector of claim 15, wherein:
the first photonic crystal scintillator exhibits a first emission wavelength;
the second photonic crystal scintillator exhibits a second emission wavelength;
the first emission wavelength is different from the second emission wavelength;
the plurality of air columns extending into the first photonic crystal scintillator generally have a first column radius determined based on the first emission wavelength; and
the plurality of air columns extending into the second photonic crystal scintillator generally have a second column radius determined based on the second emission wavelength.

17. A method for manufacturing a photonic crystal scintillator, the method comprising:
generating an alumina membrane by anodizing aluminum foil, wherein the alumina membrane comprises a plurality of pores arranged in a generally hexagonal lattice structure;
affixing the alumina membrane adjacent to a surface of a scintillator;
performing an etching technique to generate a plurality of holes in the scintillator, wherein the plurality of holes are respectively located beneath the plurality of pores; and
removing the alumina membrane from the surface of the scintillator;
coating the surface of the scintillator with a coating material prior to affixing the alumina membrane;
wherein affixing the alumina membrane adjacent to the surface of the scintillator comprises affixing the alumina membrane adjacent to the coating material;
wherein performing the etching technique to generate the plurality of holes in the scintillator comprises performing the etching technique to generate the plurality of holes in the coating material; and
wherein removing the alumina membrane from the surface of the scintillator comprises removing the alumina membrane from the coating material;
wherein the coating material has a dielectric constant substantially equal to the dielectric constant of the scintillator.

* * * * *